United States Patent [19]
Gardiner

[11] Patent Number: 5,817,329
[45] Date of Patent: Oct. 6, 1998

[54] NUTRITIONAL SUPPLEMENT FOR INCREASED MUSCLE SIZE AND STRENGTH FOR BODY BUILDERS

[76] Inventor: Paul T. Gardiner, 46 Gladstone Sq., Brampton, Ont, Canada, L6S-2H6

[21] Appl. No.: 806,124

[22] Filed: Feb. 28, 1997

[51] Int. Cl.⁶ ................................................. A61K 47/00
[52] U.S. Cl. ........................... 424/439; 426/72; 424/449; 562/516; 514/561
[58] Field of Search .................. 424/439, 449; 426/72; 562/516; 514/561

[56] References Cited

U.S. PATENT DOCUMENTS

| | | | |
|---|---|---|---|
| 4,144,357 | 3/1979 | Mohammed | 426/96 |
| 4,687,782 | 8/1987 | Brantmam | 514/561 |
| 4,871,550 | 10/1989 | Millman | 424/601 |
| 4,920,098 | 4/1990 | Cotter et al. | 514/2 |
| 4,962,121 | 10/1990 | Hamberger et al. | 514/419 |
| 4,973,467 | 11/1990 | Sahley | 424/439 |
| 4,980,168 | 12/1990 | Sahley | 424/439 |
| 5,032,411 | 7/1991 | Stray-Gunderson | 426/74 |
| 5,064,810 | 11/1991 | Askanazi et al. | 514/2 |
| 5,071,874 | 12/1991 | Scholl et al. | 514/561 |
| 5,114,723 | 5/1992 | Stray-Gunderson | 426/74 |
| 5,128,325 | 7/1992 | Park | 514/3 |
| 5,135,866 | 8/1992 | Heifetz et al. | 435/240.31 |
| 5,208,260 | 5/1993 | Cordi et al. | 514/56 |
| 5,215,750 | 6/1993 | Keane, II | 424/440 |
| 5,231,085 | 7/1993 | Alexander | 514/44 |
| 5,326,569 | 7/1994 | Acosta et al. | 424/440 |
| 5,397,786 | 3/1995 | Simone | 514/300 |
| 5,405,613 | 4/1995 | Rowland | 514/2 |
| 5,420,107 | 5/1995 | Brooks | 424/39 |
| 5,438,042 | 8/1995 | Schmidl | 514/21 |
| 5,472,730 | 12/1995 | Saikusa et al. | 426/618 |
| 5,480,674 | 1/1996 | Peterson | 426/534 |
| 5,504,072 | 4/1996 | Schmidl et al. | 514/21 |
| 5,520,948 | 5/1996 | Kvamme | 426/590 |
| 5,550,146 | 8/1996 | Acosta et al. | 514/400 |
| 5,556,644 | 9/1996 | Chandra | 424/630 |
| 5,571,783 | 11/1996 | Montagne et al. | 514/2 |
| 5,576,351 | 11/1996 | Yoshimura et al. | 514/565 |
| 5,587,399 | 12/1996 | Acosta et al. | 514/561 |

OTHER PUBLICATIONS

M. G. DiPasquale, *The Bodybuilding Supplement Review*, Optimum Training Systems, 1995.

C. Di Giacomo et al, Effect of Acetyl–L–Carnitine on Lipid Peroxidation and Xanthine Oxidase Activity in Rat Skeletal Muscle, *Neurochemical Research* 1993; 18 (11):1157–1162.

B. Bidzinska et al, Effect of Different Chronic Intermittent Stressors and Acetyl–I–Cartinine on Hypothalamic Beta–Endorphin and GnRH and on Plasma Testosterone Levels in Male Rats, *Neuroendocrinology* 1993; 57:985–990.

L. Cynober et al, Action of Ornithine Alpha–Ketoglutarate, Ornithine Hydrochloride, and Calcium Alpha–Ketoglutarate on Plasma Amino Acid and Hormonal Patterns in Healthy Subjects, *J. Am. Coll. Nutr.* 1990; 9(1); 2–12.

M. May et al, Effects of Branched–Chain Amino Acids on Protein Turnover, *Diabetes/Metabolism Reviews*, 1989; 5(3):227–245.

M.J. Rennie et al, Skeletal Muscle Glutamine Transport, Intramuscular Glutamine Concentration, and Muscle–Protein Turnover, *Metabolism* 1989; 38(8 Suppl. 1); 47–51.

T. C. Wellbourne, Increased Plasma Bicarbonate and Growth Hormone After an Oral Glutamine Load, *Am J. Clin. Nutr.* 1995; 61:1058–1061.

(List continued on next page.)

*Primary Examiner*—Thurman K. Page
*Assistant Examiner*—D. Faulkner
*Attorney, Agent, or Firm*—Dinsmore & Shohl LLP

[57] ABSTRACT

The present invention relates to the method and composition for use of diet supplements by athletes and bodybuilders. A first supplement comprising, the amino acid acetyl-L-Carnitine, in conjunction with a series of nutritionally essential branched-chain amino acids, zinc, OKG, taurine, in conjunction with two other independently administered supplements: a fat burning agent and a creatine synthesizer.

18 Claims, 2 Drawing Sheets

OTHER PUBLICATIONS

F. Hammarqvist et al, Alpha–Ketoglutarate Preserves Protein Synthesis and Free Glutamine in Skeletal Muscle After Surgery, *Surgery* 1991:109(1); 28–36.

Krsrnavovic et al, Stimulation of Gonadotropin–Releasing Hormone Secretion by Acetyl–L–Carnitine in Hypothalamic Neurons and GT1 Neuronal Cells, *Neuroscience Letters,* 165 (1994) 33–36.

NUTRITIONAL SUPPLEMENT FOR INCREASED MUSCLE SIZE AND STRENGTH FOR BODY BUILDERS

FIELD OF THE INVENTION

The present invention is directed to compositions for a series of diet supplements and to methods of administering the compositions on a daily basis to athletes or bodybuilders, for enhancing bodybuilding activities.

BACKGROUND OF THE INVENTION

Athletes who participate in sports at any level, amateur or professional, strive to bring their bodies to a physical state which is optimum for the sport or activity of interest. One factor which enables athletes to participate effectively is a high degree of development of the aerobic capacity and/or strength of skeletal muscle.

Both aerobic capacity and strength, especially the latter, is a function of training and of muscle mass. These in turn require net synthesis of proteins in the muscle. Strenuous exercise is an effective stimulus for protein synthesis. However, muscle requires a large array of nutrients, including amino acids (which are derived from protein) for protein synthesis. These nutrient substrates have been supplied by ingesting diets which provide the necessary amounts of protein (the source of amino acids), calories and other nutrients.

The desire to attain, in a rapid manner, the maximum degree of skeletal muscle adaptation to exercise has led some athletes to resort to the use of drugs. Such drugs, particularly steroids, are known to "force" muscle growth (protein synthesis) to degrees greater than can be achieved by exercise and diet alone. The use of such drugs is both illegal and dangerous. The use of steroids causes the body to be in a constant anabolic state where large amounts of testosterone are produced. The side effects of steroids are dangerous and unacceptable.

Thus, it is desirable to apply training programs which employ a combination of specific exercise technique and a diet without steroids. The known and accepted manner for stimulation of the protein synthesis required for skeletal muscle adaptation is the use of L-carnitine, which works on the liver.

Nearly all amino acids, both essential (indispensible) and non-essential (dispensable) are required by cells as substrates (i.e., raw materials) for protein synthesis. However, previous inventions have utilized the specific application of certain amino acids (carnitine, glutamine, isoleucine, leucine and valine), to exert net stimulatory effects on protein synthesis in skeletal muscle through a process occuring in the liver.

Nine amino acids are known to be essential nutrients in the diet of healthy adults. Three of these essential amino acids are isoleucine, leucine and valine; they are termed the "branched amino acids" or "branched-chain amino acids" (BAA) because they share a specific type of chemical structure. For over a decade the BAA—and leucine in particular—have been known to stimulate protein synthesis in at least some skeletal muscles. The BAA produce this effect in liver as well. Branched chain amino acids can decrease protein catabolism, increase synthesis of hepatic and muscle protein, and serve as energy substrates for muscle tissues. Ammonia production may also be reduced when branched-chain amino acids are given as a substrate. Further, branched-chain amino acids can improve the nitrogen balance.

The relationship between the BAA and skeletal muscle is even more intimate, a fact which is significant to this invention. Certain metabolic reactions involving the BAA occur in many organs. Since skeletal muscle mass in total is greater than any other organ, the reactions of BAA in muscle are thus of quantitative significance.

It is well known that skeletal muscle is the primary site for the initial step in the catabolism of the BAA. Catabolism is the metabolic breaking down of the BAA resulting in energy production, and is often termed "oxidation" or "burning".

The first metabolic reaction in oxidative catabolism of BAA is "transamination" (enzymatic transfer of the alpha-amino group to another molecule) resulting in the formation of a branched keto acid (BKA) and a different amino acid. The BKA can either accept an amino group, thus becoming a BAA again; or be further and irreversibly catabolized for calories. The BKA are so catabolized to a lesser extent within muscle cells. The major quantity of BKA is exported from muscle via the blood to other organs (such as liver and kidney) where they are catabolized or re-aminated.

It is well known that strenuous exercise increases the oxidation ("burning") of BAA. In fact, it has been shown that trained muscle, while in the resting (non-exercising state), also oxidizes more BAA than non-trained muscle. Further, it has been shown that the BAA burned by skeletal muscle during exercise is derived from muscle protein which is degraded during exercise, as well as from BAA delivered to the muscle in the bloodstream. The major source, during exercise, of the blood-borne BAA is the liver.

Thus, it is known that exercise causes transient periods (which extend beyond the actual exercise) wherein the normal balance in skeletal muscle of protein synthesis and degradation has been tipped toward a net, or relative, increase in protein degradation. That is, strenuous exercise causes muscle to burn up a portion of its protein structure.

The reason for this increased "burning" of protein, especially BAA, is not clear. Some have suggested that this process reflects a "clean up" of damage caused by exercise-induced ischemia. Others suggest that increased protein oxidation contributes to the increased caloric demand of exercise. However, it has been clearly shown that the quantitative contribution of protein oxidation to the increased energy needs of exercise is quite small. Nevertheless, oxidation of BAA may be significant in view of the fact that their oxidation generates the amino acids alanine and glutamine, which can be transported from muscle to be used as fuels elsewhere. Alanine is carried, via the blood, to the liver where it contributes to the formation of glucose, the latter being the preferred fuel of the brain. Glutamine is a known fuel for the kidney and intestine. Whatever the reason, it appears that increased oxidation of protein and BAA during exercise is obligatory.

One of the functions for the oxidation of BAA in exercising muscle is, in effect, to remove lactate from muscle. It is well known that strenuously exercising muscle burns glucose in a largely anaerobic manner, resulting in the generation of lactate (lactate is derived directly from pyruvate). Build up of lactate in muscle is associated with muscle fatigue, and is considered to be undesirable.

The amino groups of the BAA are transferred via intermediate reactions, to pyruvate, resulting in the formation of alanine. Alanine is exported to the liver to participate in glucose synthesis. That pyruvate which is thus involved in alanine synthesis is not converted to lactate. Therefore, BAA oxidation serves, in effect, to modulate lactate accumulation in muscle.

In addition, protons H<+> from catabolic reactions must be eliminated, so as to remove any risk of a drop in pH. The proton is removed from muscle by combining (in the form of ammonium-NH<+>4) with glutamate to form glutamine. When taken up by the kidney, [NH<30>4] NH<+>4 (and hence H<+>) is removed and excreted via the acid urine.

The amino acid L-glutamine is involved in the synthesis of gamma -aminobutyric acid (GABA), a known inhibitory brain neurotransmitter. Increases in GABA are known to result in reduced anxiety and alcohol consumption.

SUMMARY OF THE INVENTION

In summary, the object of the present invention is to provide a series of diet supplement compositions and methods for the administration of the compositions on a daily basis in order to promote muscle adaptation to strenuous exercise.

In its broadest embodiment, the invention relates to methods of supplementing the diet of a bodybuilder by administering acetyl-L-carnitine on a daily basis.

In one more specific embodiment, the invention comprises a first diet supplement composition comprising the following components in the indicated amounts:

| Component | Minimum and Maximum weight % ranges |
| --- | --- |
| Acetyl-L-Carnitine | about 8% to about 65% |
| L-Glutamine | about 17% to about 75% |
| L-Leucine | about 4% to about 61% |
| L-Isoleucine | about 2% to about 60% |
| L-Valine | about 2% to about 60% |
| Ornithine alpha-ketoglutarate | about 0.8% to about 58% |
| Zinc | about 0.5% to about 2% |
| Taurine | about 8% to about 34% |

In a second embodiment, the invention comprises administering the first diet supplement to an athlete or bodybuilder on a daily basis, using the following daily dosages:

| Component | Minimum and Maximum daily dosage |
| --- | --- |
| Acetyl-L-Carnitine | about 500 mg to about 2000 mg |
| L-Glutamine | about 1000 mg to about 3000 mg |
| L-Leucine | about 250 mg to about 5000 mg |
| L-Isoleucine | about 75 mg to about 2000 mg |
| L-Valine | about 75 mg to about 2000 mg |
| Ornithine alpha-ketoglutarate | about 50 mg to about 1000 mg |
| Zinc | about 30 mg to about 100 mg |
| Taurine | about 500 mg to about 2000 mg |

In a third embodiment, the present invention is directed to a method of supplementing the diet of an athlete, comprising the steps of:

(a) administering to the athlete on a daily basis, the first supplement composition, comprising:

| Component | Minimum and Maximum daily dosage |
| --- | --- |
| Acetyl-L-Carnitine | about 500 mg to about 2000 mg |
| L-Glutamine | about 1000 mg to about 3000 mg |
| L-Leucine | about 250 mg to about 5000 mg |
| L-Isoleucine | about 75 mg to about 2000 mg |
| L-Valine | about 75 mg to about 2000 mg |
| Ornithine alpha-ketoglutarate | about 50 mg to about 1000 mg |
| Zinc | about 30 mg to about 100 mg |
| Taurine | about 500 mg to about 2000 mg; |

(b): administering to the athlete on a daily basis and before breakfast and lunch, a second supplement composition administered to said athlete independently of said first supplement, from about 30 minutes to about 60 minutes before breakfast and lunch, respectively, wherein the second supplement comprises:
  (i) from about 800 mg to about 1100 mg of hydroxy-citric acid;
  (ii) from about 10 mg to about 22 mg of ephedra;
  (iii) from about 75 mg to about 214 mg of caffine;
  (iv) from about 14 mg to about 16 mg of salicin;
  (v) from about 95 mg to about 200 mg of L-Carnitine; and
  (vi) from about 250 mcg to about 325 mg of chromium picolinate;

(c): administering to the athlete on a daily basis, a third supplement composition, administered independently of said first or second supplement, wherein the third supplement comprises:
  (i) from about 4500 mg to about 7000 mg of creatine monohydrate; and
  (ii) fom about 400 mg to about 600 mg of amino acids comprising:
    L-methionine, L-arginine and L-glycine, in about equal parts, by weight.

The methods and compositions provide lean, large and strong muscles when used by body building athletes.

DETAILED DESCRIPTION

Figure 1:
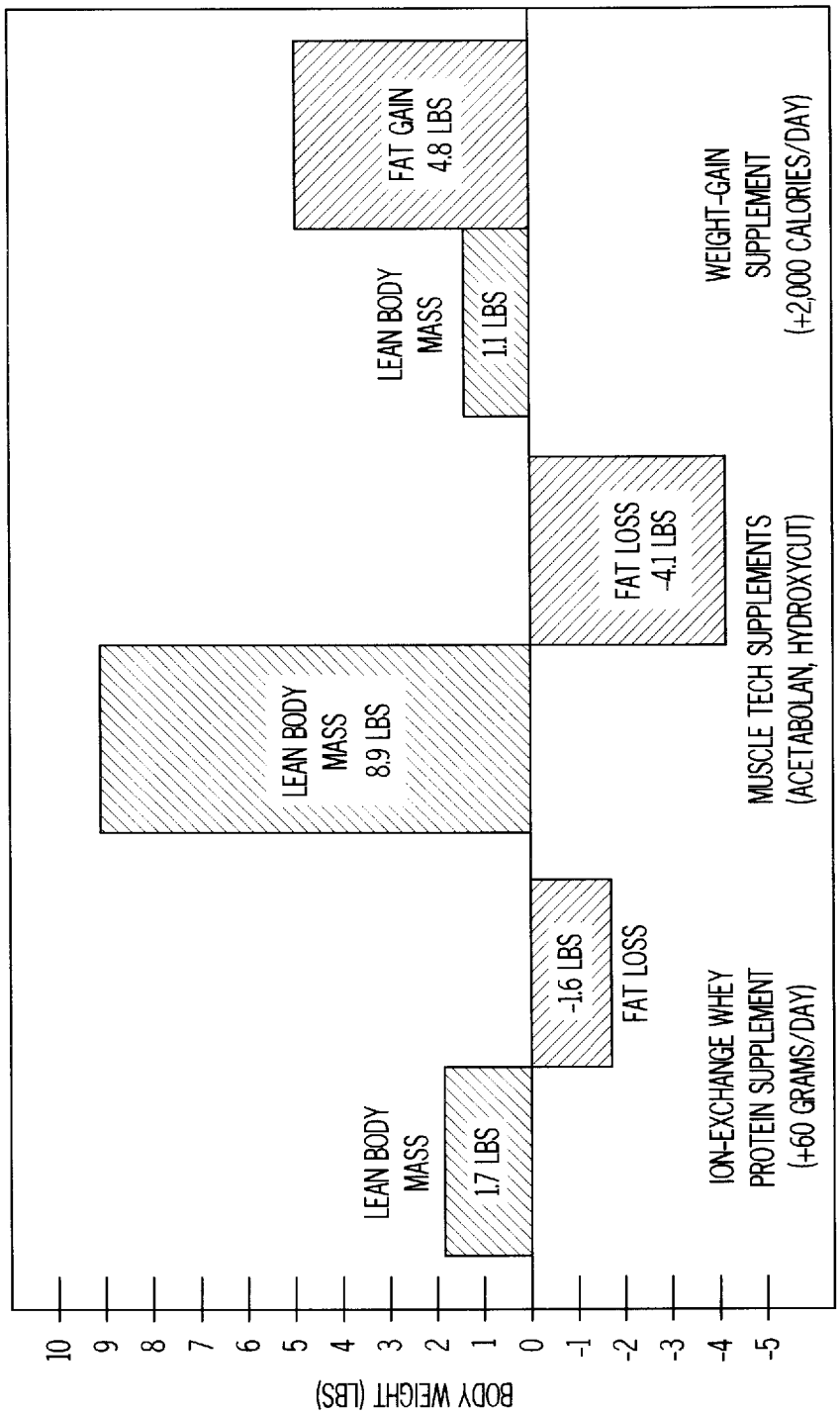
FIG. 1 shows a *Comparison of Lean Body Mass and Composition of Nutritional Supplements* on a 30 day study period for each group of products.

The present invention relates to the use of a product, comprising: the amino acid acetyl-L-Carnitine to stimulate the brain to increase production of testosterone, preferably in conjunction with a series of nutritionally essential branch chain amino acids and zinc to maintain high testosterone levels; OKG to prevent muscle breakdown; and taurine to volumize cells with water; and more preferably in conjunction with two other independently administered products: a fat burning agent and an enhanced creatine synthesizer, the invention provides methods and compositions to build lean, large and strong muscles when used by body building athletes.

The amino acid which is the critical feature of this invention is acetyl-L-carnitine. (While not all authorities will agree with designating carnitine as an amino acid, it is so designated here; the chemical designation of acetyl-L-carnitine is: acetyl-L-3-hydroxy-4-N-trimethylaminobutyrate.) The combination of acetyl-L-carnitine with L-glutamine, OKG, branched-chain amino acids, zinc and taurine is believed to act synergistically to enhance the acetyl-L-carnitine in the body, as an improved anti-catabolic/anabolic mixture available for the body-builder.

The administration of large amounts of acetyl-L-carnitine, such that enough of it goes directly to the blood brain barrier, has not previously been suggested for use for athletes or bodybuilders; and its use is new and novel as a method of supplementing the diet of athletes and bodybuilders. The inventor believes that acetyl-L-carnitine stimulates the increased production of testosterone and has an anticatabolic effect on skeletal muscle, although the inventor does not intend to be bound by this belief or the additional theories set forth herein with respect to the physiological reactions described herein.

The inventor believes that the inclusion of branch-chain amino acids also assists the body to maintain high testosterone levels.

The inventor believes that the inclusion of moderate levels of zinc assists the body maintain high testosterone levels.

The inventor believes that the inclusion of Ornithine alpha-Ketoglutarate prevents muscle breakdown.

The inventor believes that the inclusion of taurine volumizes cells with water.

The inventor believes that the administration of large amounts of L-glutamine encourages proton efflux from muscle, so as to maintain intramuscular pH at optimum.

A second supplement is used as part of the inventor's total body building program. This second supplement is a highly effective fat-burning supplement containing about 1000 mg of the high quality hydroxycitric acid (HCA), preferably supplied as 2000 mg of hydroxagen. HCA has been proven to reduce the conversion of carbohydrate calories to bodyfat. HCA decreases fat production and also increases glycogen storage for more massive pumps and better and more energized workouts.

The second supplement also contains, in its preferred embodiment:

(i) about 334 mg Mahuang Extract (containing 6% wt. ephedra) or other herb containing about 20 mg of ephedra;

(ii) about 910 mg Guarana Extract (containing 22% wt. caffine) or other herb containing about 200 mg of caffine;

(iii) about 100 mg Willow Bark Extract (containing 15% wt. salicin); or other herb containing about 15 mg of salicin.

The third dietary supplement contains 6000 mg of creatine monohydrate, along with some of the essential amino acids necessary for creatine synthesis in the body—i.e. glycine, arginine and methionine, such that creatine monohydrate absorption is greatly enhanced.

It is believed that the ingredient acetyl-L-carnitine goes directly to the blood brain barrier and stimulates the increased production of testosterone. It is also believed that the inclusion of branch-chain amino acids also assist the body to maintain high testosterone levels. It is further believed that moderate levels of zinc are needed to assist the body maintain high testosterone levels. Ornithine alpha-Ketoglutarate is believed to prevent muscle breakdown.

A further observation concerns the BAA and the liver. It is known that during strenuous exercise in man the liver suffers a net loss of the BAA; the skeletal muscle concomitantly takes up BAA from the blood. Thus, the increased burning of BAA in muscle seems to cause a "drain" on the BAA stored in liver protein. This BAA must derive from a net degradation of liver protein. Further, it has been noted that the rate of protein breakdown in the liver can be partly reversed by amino acids—in particular glutamine. In particular, it was noted that an increased amount of glutamine was exported from the liver during exercise, which may be related to the effect of this amino acid on protein synthesis. Glutamine is, therefore, preferably included in the supplement compositions of the invention, to provide the liver with that amino acid which is known to encourage protein synthesis, in the proper metabolic environment.

The inventor's preferred embodiment of the first supplement is:

| Component | Recommended daily dosage |
|---|---|
| Acetyl-L-Carnitine | about 1000 mg |
| L-Glutamine | about 2000 mg |
| L-Leucine | about 1000 mg |
| L-Isoleucine | about 250 mg |
| L-Valine | about 250 mg |
| Ornithine alpha-ketoglutarate | about 100 mg |
| Zinc | about 60 mg |
| Taurine | about 1000 mg |

Figure 2:
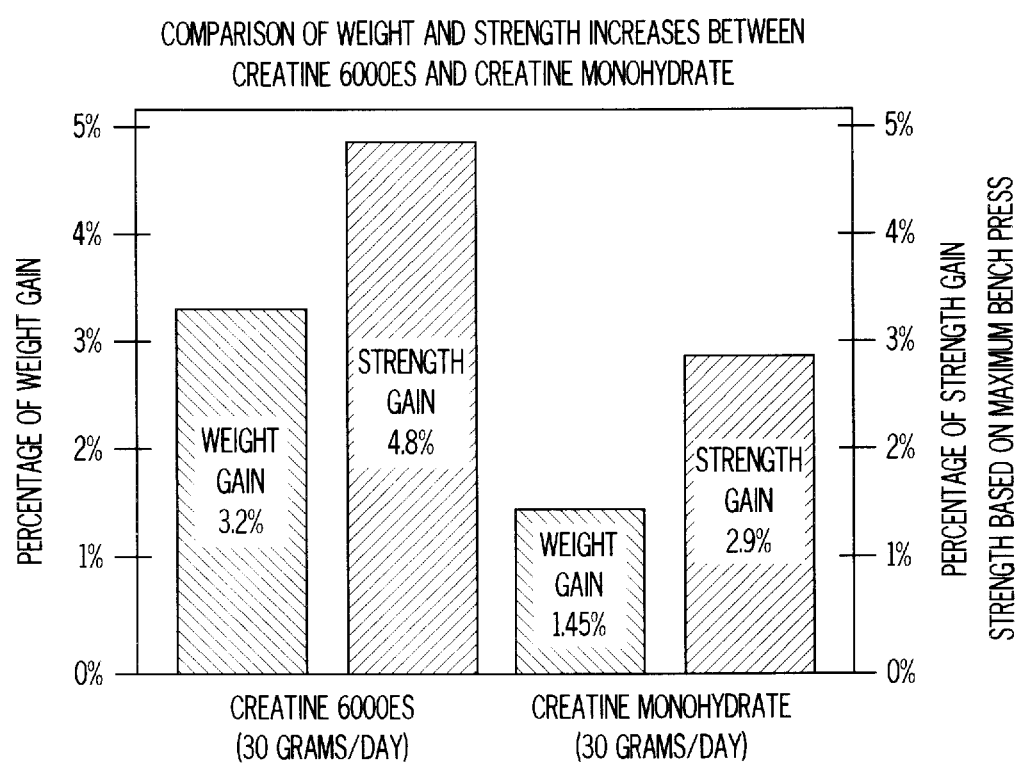
FIG. 2 gives the percentage of weight gain and the percentage of strength gain when using 30 grams per day of either the inventor's third diet supplement or creatine monohydrate, for a ten day period.

FIGS. 1 & 2 show the results of studies conducted by the inventor and his research associates. Twelve test subjects were involved, all of whom were experienced weight trainers, with a minimum of three years training. To insure that the effect of muscle memory (regaining previously developed muscle) had no part in the results, each athlete was selected because he had been in hard training for the previous six months, before starting the study.

Members of the group were asked to maintain a similar weight-training regimen throughout the entire study. They were also requested to keep their diet consistent and consume a minimum of 2.2 grams of protein per kilogram of bodyweight. No other supplements or performance-enhancing drugs were to be used during the test period.

The experiment's approach was to measure the effectiveness of supplements by comparing lean muscle gains to fat gain or reduction of fat. The supplements chosen were, respectively, a high-quality ion-exchange protein, a high-quality weight-gain power, and, for comparison, the inventor's three supplements.

Before and after each group of tests, the athletes were given bodyfat tests to determine muscle mass gained vs. fat lost. Clearly, the use of the inventor's three products produced the best result, with a gain of 8.9 lbs of lean body mass (muscle) and a loss of 4.1 lbs of body fat.

FIG. 2 shows the difference between substituting creatine monohydrate verses the inventor's third supplement, on a 30 grams per day dosage for ten days for each product. The products were used in conjunction with the inventor's first supplement and the inventor's second supplement. Lean weight gain and strength increases in the bench press were monitored. The experiments revealed that use of the inventor's third supplement resulted in 120 percent greater gains in bodyweight and over 66 percent greater gains in strength than the regular creatine monohydrate products. Some athletes had gained as much as 16 pounds of bodyweight and 45 pounds strength on their bench press in only 10 days when using the third supplement.

The specific embodiments and examples set forth above are provided to illustrate the invention and are not intended as limiting. Additional embodiments within the scope of the claims will be apparent to those skilled in the art.

I claim:

1. A method of supplementing the diet of an athlete, comprising administering acetyl-L-carnitine to the athlete in a dosage of about 500 mg to about 1500 mg of acetyl-L-carnitine on a daily basis.

2. A method according to claim 1, where the acetyl-L-carnitine is administered in combination with L-glutamine, L-Leucine, L-Isoleucine and L-Valine.

3. A method according to claim 1, where the acetyl-L-carnitine is administered in combination with L-glutamine, L-Leucine, L-Isoleucine, L-Valine and Ornithine alpha-ketoglutarate.

4. A method according to claim 1, where the acetyl-L-carnitine is administered in combination with L-glutamine, L-Leucine, L-Isoleucine, L-Valine, Ornithine alpha-ketoglutarate and zinc.

5. A method according to claim 1, where the acetyl-L-carnitine is administered in combination with L-glutamine, L-Leucine, L-Isoleucine, L-Valine, Ornithine alpha-ketoglutarate, zinc and taurine.

6. A composition for supplementing the diet of an athlete, comprising the following components in the indicated amounts:

| Component | Weight % ranges |
|---|---|
| Acetyl-L-Carnitine | about 8% to about 65% |
| L-Glutamine | about 17% to about 75% |
| L-Leucine | about 4% to about 61% |
| L-Isoleucine | about 2% to about 60% |
| L-Valine | about 2% to about 60% |
| Ornithine alpha-ketoglutarate | about 0.8% to about 58% |
| Zinc | about 0.5% to about 2% |
| Taurine | about 8% to about 34% |

7. A composition according to claim 6, wherein a daily dosage of the composition comprises:

| Component | Daily dosage |
|---|---|
| Acetyl-L-Carnitine | about 500 mg to about 2000 mg |
| L-Glutamine | about 1000 mg to about 3000 mg |
| L-Leucine | about 250 mg to about 5000 mg |
| L-Isoleucine | about 75 mg to about 2000 mg |
| L-Valine | about 75 mg to about 2000 mg |
| Ornithine alpha-ketoglutarate | about 50 mg to about 1000 mg |
| Zinc | about 30 mg to about 100 mg |
| Taurine | about 500 mg to about 2000 mg |

8. A composition as in claim 7, where the daily dosage comprises:

| Component | Daily dosage |
|---|---|
| Acetyl-L-Carnitine | about 1000 mg |
| L-Glutamine | about 2000 mg |
| L-Leucine | about 1000 mg |
| L-Isoleucine | about 250 mg |
| L-Valine | about 250 mg |
| Ornithine alpha-ketoglutarate | about 100 mg |
| Zinc | about 60 mg |
| Taurine | about 1000 mg |

9. A method of supplementing the diet of an athlete, comprising, administering to the athlete on a daily basis, a first diet supplement composition comprising:

| Component | Daily dosage |
|---|---|
| Acetyl-L-Carnitine | about 500 mg to about 2000 mg |
| L-Glutamine | about 1000 mg to about 3000 mg |
| L-Leucine | about 250 mg to about 5000 mg |
| L-Isoleucine | about 75 mg to about 2000 mg |
| L-Valine | about 75 mg to about 2000 mg |
| Ornithine alpha-ketoglutarate | about 50 mg to about 1000 mg |
| Zinc | about 30 mg to about 100 mg |
| Taurine | about 500 mg to about 2000 mg |

10. A method of supplementing the diet of an athlete, as in claim 9 where the daily dosage of said first diet supplement composition comprises:

| Component | Daily dosage |
|---|---|
| Acetyl-L-Carnitine | about 1000 mg |
| L-Glutamine | about 2000 mg |
| L-Leucine | about 1000 mg |
| L-Isoleucine | about 250 mg |
| L-Valine | about 250 mg |
| Ornithine alpha-ketoglutarate | about 100 mg |
| Zinc | about 60 mg |
| Taurine | about 1000 mg |

11. A method of supplementing the diet of an athlete, comprising the steps of:

(a) administering to the athlete on a daily basis, a first supplement composition comprising:

| Component | Daily Dosage |
|---|---|
| Acetyl-L-Carnitine | about 500 mg to about 2000 mg |
| L-Glutamine | about 1000 mg to about 3000 mg |
| L-Leucine | about 250 mg to about 5000 mg |
| L-Isoleucine | about 75 mg to about 2000 mg |
| L-Valine | about 75 mg to about 2000 mg |
| Ornithine alpha-ketoglutarate | about 50 mg to about 1000 mg |
| Zinc | about 30 mg to about 100 mg |
| Taurine | about 500 mg to about 2000 mg |

(b) administering to the athlete on a daily basis and before each meal, a second supplement composition, administered to said athlete independently of said first supplement, from about 30 minutes to about 60 minutes before each meal, respectively, wherein the second supplement comprises:

(i) from about 800 mg to about 1100 mg of hydroxy-citric acid;

(ii) from about 10 mg to about 22 mg of ephedra;

(iii) from about 75 mg to about 214 mg of caffeine;

(iv) from about 14 mg to about 16 mg of salicin;

(v) from about 95 mg to about 200 mg of L-Carnitine; and (vi) from about 250 mcg to about 325 mcg of chromium picolinate; and (c) administering to the athlete on a daily basis, a third supplement composition, administered independently of said first or second supplement, wherein the third supplement comprises:

(i) from about 4500 mg to about 7000 mg of creatine monohydrate; and (ii) from about 400 mg to about 600 mg of amino acids comprising L-methionine, L-arginine and L-glycine, in about equal parts, by weight.

12. A method of supplementing the diet of an athlete as in claim 11, wherein the daily dosage of said first diet supplement is:

| Component | Daily dosage |
| --- | --- |
| Acetyl-L-Carnitine | about 1000 mg |
| L-Glutamine | about 2000 mg |
| L-Leucine | about 1000 mg |
| L-Isoleucine | about 250 mg |
| L-Valine | about 250 mg |
| Ornithine alpha-ketoglutarate | about 100 mg |
| Zinc | about 60 mg |
| Taurine | about 1000 mg |

13. A method of supplementing the diet of an athlete as in claim 11, wherein said second diet supplement dosage administered before each meal comprises:

(i) about 1000 mg of hydroxycitric acid;

(ii) about 20 mg of ephedra;

(iii) about 200 mg of caffine;

(iv) about 15 mg of salicin;

(v) about 100 mg L-Carnitine; and (vi) about 300 mcg chromium picolinate.

14. A method of supplementing the diet of an athlete as in claim 11, wherein said third diet supplement dosage administered before each meal comprises:

(i) about 6000 mg creatine monohydrate; and (ii) about 500 mg of amino acids comprising L-methionine, L-arginine and L-glycine in about equal parts, by weight.

15. A method according to any one of claims 11, 12, 13 or 14 wherein the ephedra is included as a Mahuang Extract.

16. A method according to any one of claims 11, 12, 13 or 14 wherein the caffine is included as a Guarana Extract.

17. A method according to any one of claims 11, 12, 13, or 14 wherein the salicin is included as a Willow Bark Extract.

18. A method according to any one of claims 11, 12, 13 or 14 wherein the Hydroxycitric acid is included as a Garcinia Cabogia Extract.

* * * * *